Oct. 3, 1961 — E. E. BRANDES — 3,002,442
HEAT DISPERSING STRUCTURE
Filed Feb. 23, 1960
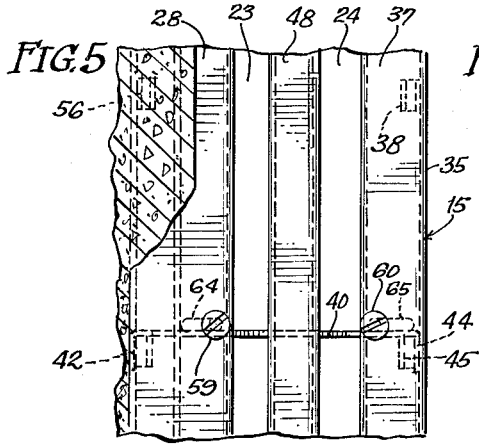
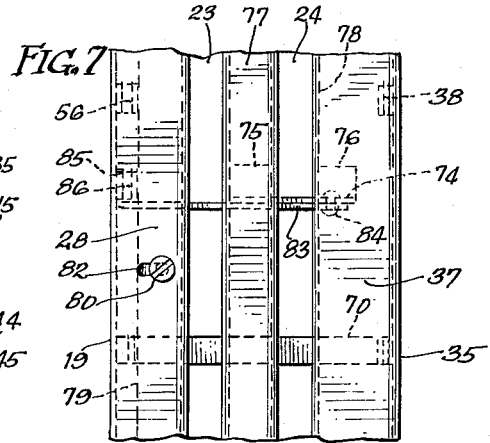
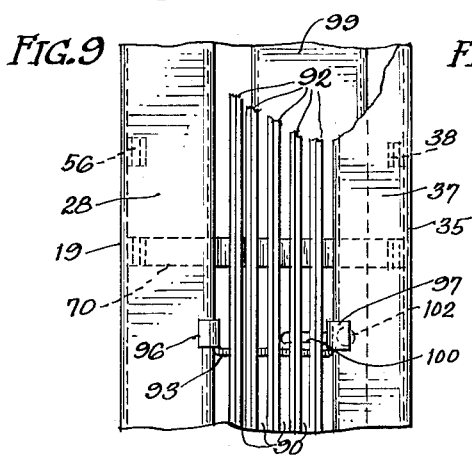
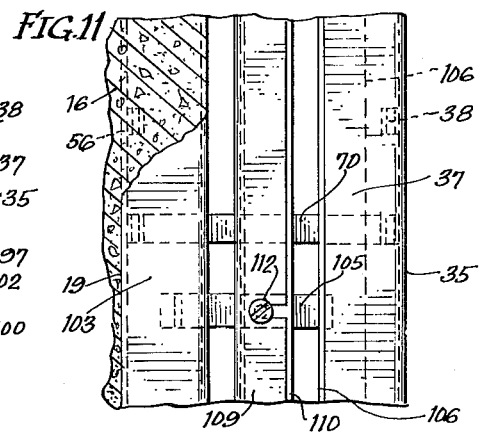
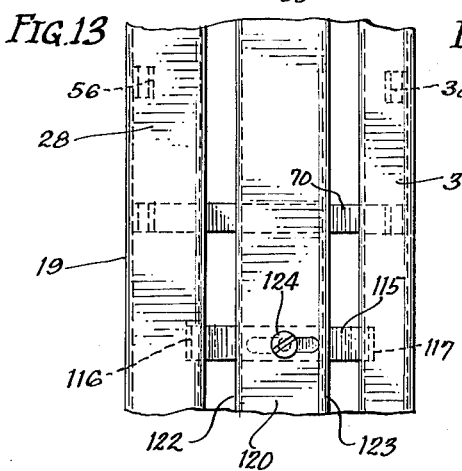
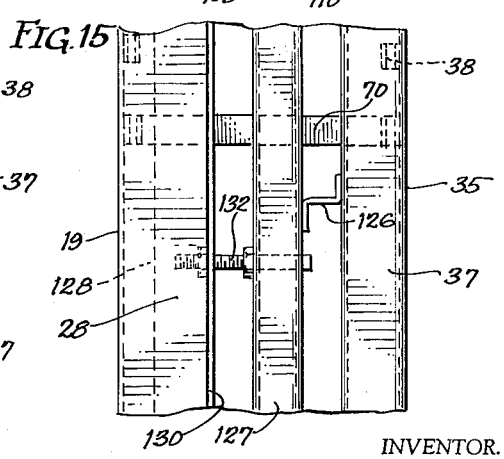
INVENTOR.
ERNEST E. BRANDES
BY Horton, Davis, Brewer & Brugman
Att'ys Oct. 3, 1961
E. E. BRANDES
3,002,442
HEAT DISPERSING STRUCTURE
Filed Feb. 23, 1960
3 Sheets-Sheet 3
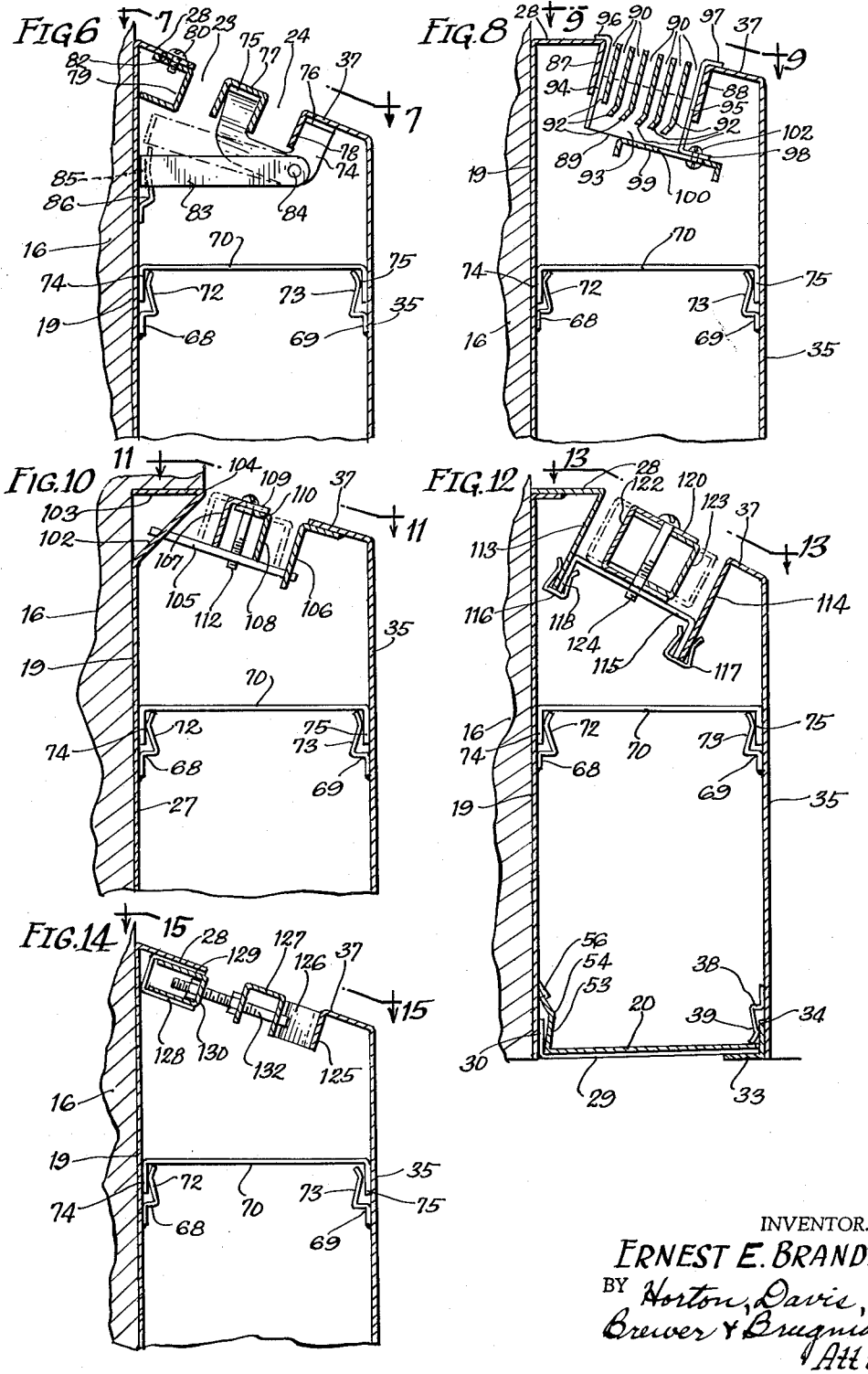
INVENTOR.
ERNEST E. BRANDES
BY Horton, Davis,
Brewer & Brugman
Att'ys

United States Patent Office 3,002,442
Patented Oct. 3, 1961

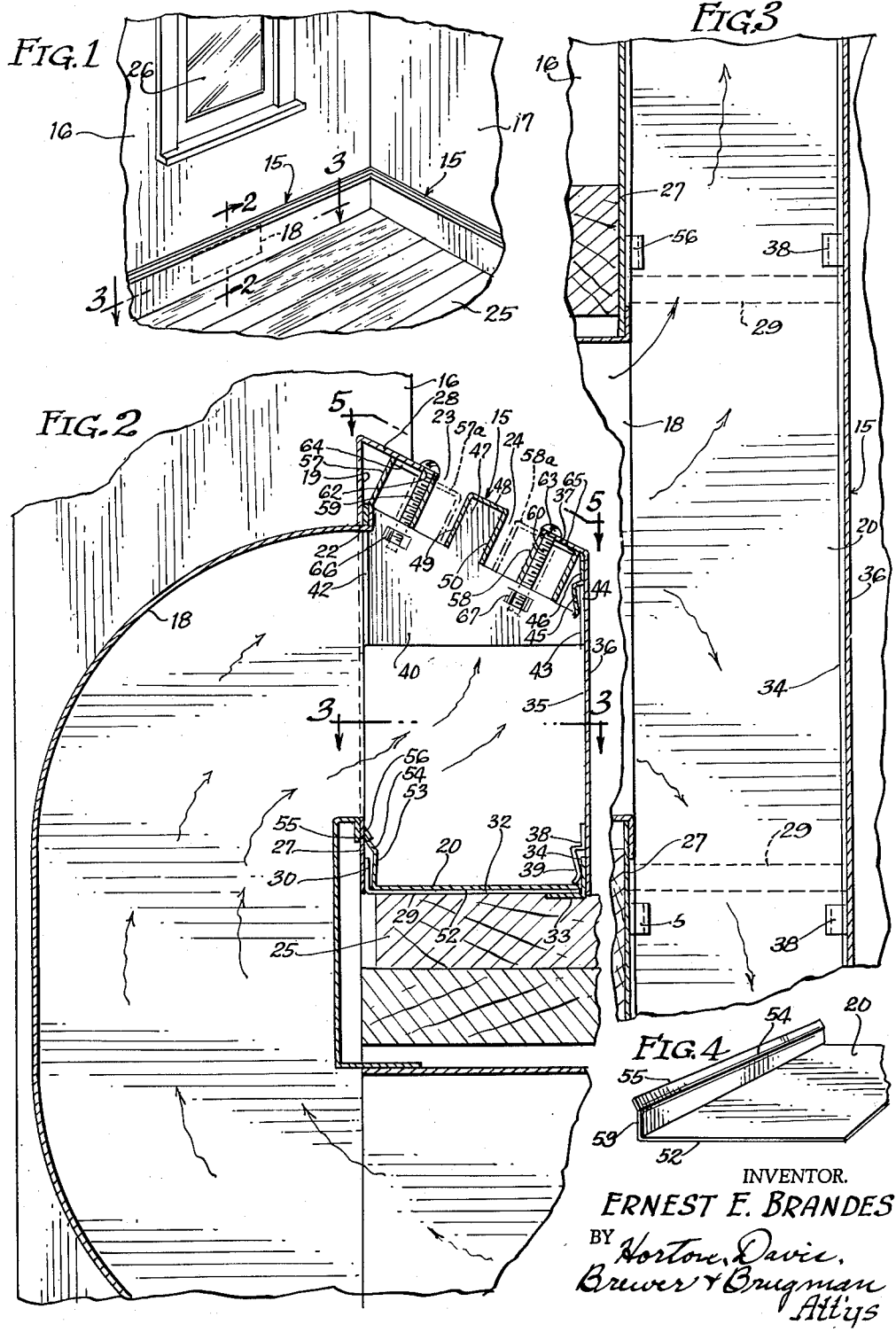

3,002,442
HEAT DISPERSING STRUCTURE
Ernest E. Brandes, 2046 Winnebago St., Madison, Wis.
Filed Feb. 23, 1960, Ser. No. 10,119
6 Claims. (Cl. 98—40)

This invention relates to heat distributing and dispersing structure which is adapted to the distribution and dispersal of air for heating or cooling purposes and which is constructed and arranged to provide manufacturing economy, as well as ease of installation and adjustment to accomplish effective heat distribution in various installations.

In different buildings and in the different rooms of buildings, the sizes, number and placements of air supply conduits vary. The amount of air to be dispersed for adequate heating varies with factors including the volume of the room, the number and sizes of outside and inside walls and the number and sizes of windows. Furthermore, the sectional size of the heat dispersing structure and the air dispersing opening therein must be suited to the number and placements of air supply conduits in the room. Thus, to be adaptable to various installations, and to minimize the time, labor and stock parts required for installing and adjusting a heat dispersing structure in any of a variety of installations requires that provisions for the required variations shall be taken into account in the development of the structure as manufactured.

In larger rooms, the heat dispersing units must be larger in sectional area than those used for small rooms, and the quantity of air required to be dispersed gives rise to the necessity for larger and adjustable air dispersing openings in order to keep the noise of the moving air below an objectionable level.

It is therefore a general object of this invention to provide a heat dispersing structure having parts which are adapted to assembly at the time of installation and which includes elements that are readily adjustable at positions along the length of the assembled structure to vary the quantity of air dispersed therefrom.

Another object of my invention is to provide a heat dispersing structure having front and back parts in spaced and opposed relationship and serving as portions of an air duct having a plurality of slot-type openings in the top thereof for the dispersion of air, and at least one of which slot-type openings is variable in width for regulating the air flow therethrough.

This invention further has within its purview the provision of a heat dispersing structure including front and back wall portions spaced from one another by strip-type bottom elements of uniform length and separated longitudinally of the structure, said structure having a bottom closure plate which fits into the strip-type bottom elements in the assembly of the structure.

As another object, my invention comprehends the provision of heat dispersing structure including front and back wall portions supported in spaced and opposed relationship to one another and having an opening therebetween at the top of the structure for the dispersion of air, said structure further having bridging elements extending between the front and back wall portions interiorly of the structure at positions spaced longitudinally thereof and adjacent the opening, which bridging elements, in addition to bracing the front and back wall portions relative to one another, serve as supports for partitioning means which extends along and divides the opening into parallel slots.

Other objects and advantages of the invention will be apparent from the following description and the accompanying drawings in which similar characters of reference indicate similar parts throughout the several views.

FIG. 1 is a fragmentary perspective view of the interior of a room wherein a preferred embodiment of my heat dispersing structure is installed;

FIGS. 2 and 3 are fragmentary sectional views taken substantially at positionss and in directions indicated by lines 2—2 and 3—3 respectively and the accompanying arrows in FIG. 1;

FIG. 4 is a fragmentary perspective view of a part of the structure illustrated in FIGS. 2 and 3;

FIG. 5 is a top view, partially in section, taken substantially as indicated by a line 5—5 and accompanying arrows in FIG. 2;

FIGS. 6, 8, 10, 12 and 14 are end sectional views similar to FIG. 2, but illustrating different modifications of portions of the disclosed structure; and FIGS. 7, 9, 11, 13 and 15 are respectively top plan views, similar to FIG. 5 of the modified structures depicted in FIGS. 6, 8, 10, 12 and 14.

In the disclosed heat dispersing structure, which is depicted herein for illustrative purposes, a heat dispersing unit 15 is mounted along the base of one or more walls, such as 16 and 17, of a room, and serves to disperse conditioned air thereto through one or more conduits, such as 18. Although such conduits may communicate with the interior of the heat dispersing unit 15 through either a back wall 19 or a bottom closure element 20, or both, of the units, FIG. 2 shows the conduit 18 communicating with the interior of the heat dispersing unit through an opening 22 in the back wall 19. From the conduit 18, the conditioned air is conducted along the base of the wall or walls through the heat dispersing unit 15, and is disseminated therefrom through slots 23 and 24 in the top of the unit.

Considered in greater detail, the exemplary room which is depicted in FIG. 1 has, in addition to the walls 16 and 17, a floor 25, and the wall 16 has a window 26 therein. Each heat dispersing unit 15 is mounted on the floor and extends along the wall in the position of a usual baseboard. It is customary for the units along intersecting walls to be adjoined at the corners of the room, so that there is a flow of air between the adjoined units.

In structure, the back wall 19 of the heat dispersing unit 15, which is depicted in detail in FIGS. 2 and 3, is made of sheet metal with a generally flat back panel portion 27 having an integral flange 28 extending outwardly and downwardly from the top thereof in acute angular relationship to the back panel portion. Along the bottom margin of the back panel portion, spacer strips 29 are secured to the back panel portion at positions spaced longitudinally thereof. Each spacer strip 29, in the disclosed structure, has an end flange 30 in substantially right angular relationship to a base portion 32, which end flange of each spacer strip is secured against the inner surface of the back panel portion 27, as by spot welding. At the outer ends of the spacer strips 29, an angle strip 33 is secured to the end portions of a plurality of the strips and extends along the unit in substantially parallel relationship to the back panel portion to provide an upwardly projecting flange 34 for the mounting and support of a front wall 35 for the unit.

The front wall 35 includes a relatively flat sheet metal panel portion 36 having an integral flange 37 along the top margin thereof which projects upwardly and rearwardly in obtuse angular relationship to the front panel portion. At spaced positions along the lower margin of the front panel portion, resilient metal clips 38 are secured to the inner surface of the front panel portion and have end portions 39 which extend downwardly for gripping the flange 34 on the angle strip 33 between the clips and the front panel portion to support the front wall and releasably hold it in position with respect to the back wall.

At the upper portion of the unit, additional sheet metal spacer and supporting strips 40 are secured to the inner surface of the panel portion 27 and project forwardly therefrom at positions spaced longitudinally of the unit. In the disclosed structure, the spacer and supporting strips 40 each have an integral flange 42 along the rear end thereof which may be secured to the panel portion 27 by means such as spot welding. At their other ends, the spacer and supporting strips 40 each have an integral flange 43 thereon which provides an upwardly projecting tab 44 which is gripped between the front panel portion of the front wall and downwardly projecting end portions 45 of resilient clips 46 secured at spaced positions along the inner surface of the panel portion of the front wall to afford additional support for the front wall internally of the unit and near the tops of the walls.

In addition to providing bracing and support between the upper portions of the front and back walls, spacer and supporting strips 40 have upwardly projecting integral tabs 47 extending upwardly from the mid-portions thereof to serve as supports for a partition element 48 of channel section which extends longitudinally of the unit between opposed flanges 28 and 37 at the tops of the rear and front walls, respectively. Side flange portions 49 and 50 of the partition element 48 provide vanes or guide surfaces for air which is disseminated from the unit between the opposed top flanges 28 and 37.

The bottom closure element 20, in the disclosed structure, has a relatively flat bottom panel portion 52 along one side of which an integral flange 53 extends upwardly and has an obtuse angular bend 54 therein to provide an edge 55 for engagement beneath tabs 56 at spaced positions along the inner surface of the panel portion 27 of the back wall to hold the bottom closure element firmly in place. The panel portion 52 of the bottom closure element overlies the spacer strips 29 and extends across the interior of the bottom of the heat dispersing unit to the flange 34 on the angle strip 33. This bottom closure element is put in place before the front wall is put on, so that the clips 38 on the front wall overlie the margins of the closure element at their spaced positions.

The front and back walls, the bottom closure element and the partition element are manufactured in preselected fixed lengths, but may be cut to desired sizes to fit spaces smaller than the preselected lengths. When an air supply conduit is fitted into the bottom of the unit, rather than at the back, as shown in FIG. 2, the bottom closure element may be merely cut off to a desired length to extend to and from the opposite sides of the supply conduit.

For varying the widths of the slots 23 and 24, thereby to control the air flow therethrough on opposite sides of the partition element 48, between that element and the opposed flanges 28 and 37 on the back and front walls, movable elements 57 and 58 of channel section are mounted on the inner surfaces of the flanges 28 and 37, between those flanges and the edges of the spacer and supporting elements. As depicted in FIG. 2, fastening means, such as screws 59 and 60 extend through openings 62 and 63 in the flanges 28 and 37 and through slots 64 and 65 in the movable elements 57 and 58 at spaced positions along the unit. The screws have threaded engagement with punched out lugs 66 and 67 in the spacer and supporting strips 40. The movable elements 57 and 58 are coextensive with the back and front walls of the unit. When the screws are loosened, portions of the movable elements, along the length thereof, may be moved laterally of the slots 23 and 24 to positions such as those depicted at 57a and 58a, after which the screws may be tightened to hold the movable elements in their adjusted positions. Varying the widths of the slots 23 and 24, of course, changes the volume of air flow therethrough to balance the air dissemination along different walls and in different parts of the room, such as near windows or to differentiate between the dissemination along inside and outside walls. It may be observed also, that since the movable elements 57 and 58 are of channel section, they provide air guiding and directing surfaces in opposed relationship to the side flange portions 49 and 50 of the partition element 48.

In the modified structures illustrated in FIGS. 6 to 15 inclusive, the general features of construction and arrangement are quite similar to those of the heat dispersing unit already described, and parts bearing reference numerals similar to those formerly used may be considered to be alike in character and function. These modified structures may be generally characterized as providing different means for connecting and supporting the top portions of the back and front walls and for dividing and varying the top openings through which air is disseminated from the units. In each of the structures illustrated in FIGS. 6 to 15, inclusive, resilient clips 68 and 69 are secured in opposed relationship to the inner surfaces of the back and front walls 19 and 35 at the vertical mid-regions of the walls and at positions spaced longitudinally of the walls to receive spacing elements 70 for placing the front walls along the midregion thereof. The clips 68 and 69 have upwardly extending finger portions 72 and 73 which engage and hold end flanges 74 and 75 on opposite ends of the spacing elements.

In the form illustrated in FIGS. 6 and 7, substantially U-shaped brackets 74 have flanges 75 and 76 on opposite ends thereof and are secured to the inner surface of the flange 37 on the front wall 35 at positions spaced longitudinally of the unit. In the form illustrated, the flange 76 of each bracket may be spot welded to the inner surface of the flange. The other ends of the substantially U-shaped brackets extend into the space between the opposed flanges 28 and 37 on the back and front walls and serve as supports for a partitioning element 77 of channel section which extends longitudinally of the space between the opposite flanges to divide that space into coextensive slots 23 and 24. At one side of the slot 24, an auxiliary flange 78 is provided along the inner margin of the flange 37 and extends inwardly therefrom to provide an air directing surface in opposed relationship to one side of the partitioning element 77.

At the other side of the partitioning element, a movable element 79 of channel section extends longitudinally of the back wall and is supported from the flange 28 on the back wall for movement laterally of the slot 23 toward and from the partitioning element 77. In the illustrated structure, screws 80 extend through slots 82 in the flange 28 at longitudinally spaced positions along the back wall and are threaded into one side portion of the movable element 79 releasably to hold the movable element in an adjusted position. With this particular structure, the width of the slot 23 may be varied by adjustment of the position of the movable element laterally of the slot 23.

To provide additional bracing and support within the structure at the top portion thereof, an arm 83 is mounted for swinging movement on each of the brackets 74 by fastening means, such as a rivet 84. Each arm has an angularly projecting flange 85 at the end thereof which is engageable with a clip 86 secured to the inner surface of the upper portion of the back wall 19, thereby to provided bracing connections between the top portions of the back and front walls.

In the modified structure depicted in FIGS. 8 and 9, the opposed top flanges 28 and 37 on the back and front walls 19 and 35 have integral auxiliary flanges 87 and 88 thereon which extend into the space between the walls in substantially parallel and opposed relationship to one another. A vane assembly 89 is mounted and supported between the auxiliary flanges 87 and 88 to provide a plurality of air disseminating slots 90 between vanes 92 which guide and direct the discharge of the air. The vanes 92 extend longitudinally of the space between the auxiliary flanges 87 and 88 and are in substantially parallel relationship to one another. Support for the vanes 92 is provided by plates 93 at positions spaced longitudinally of the vanes. Each plate has slots in which the vanes are mounted, and each plate has flanges 94 and 95 on opposite sides thereof which engage the opposed inner surfaces of the auxiliary flanges 87 and 88 on the back and front walls. At their upper ends, the flanges 94 and 95 on each plate extend above the mid-portion of the plate and each flange is bent at its upper end to provide supporting flanges 96 and 97 which engage the top flanges 28 and 37 respectively on the back and front walls to support the vane assembly between the auxiliary flanges. Also, the flange 95 on the plate 93 has a flange 98 thereon which serves as a support for a movable plate 99; the plate 99 having slots 100 therein at positions spaced longitudinally of the plate through which fastening means, such as rivets 102 extend to support the plate 99 for movement laterally of the lower ends of the vanes. The movable plate 99 by being moved laterally of the lower ends of the vanes, effectively controls the width of the air flow space between the auxiliary flanges 87 and 88 on the back and front walls.

In the modification illustrated in FIGS. 10 and 11, the back wall 19 has a flange portion 102 extending inwardly from the panel portion 27 in obtuse angular relationship thereto, and has a top flange 103 which extends outwardly from the top of the flange 102 in acute angular relationship thereto to provide a corner edge 104 which may be used as a screed for a plastered wall. In addition, the flange 102 has slot-type openings punched therein at longitudinally spaced positions and serves as a support for the ends of bridging strips 105, the other ends of which extend through openings in an angle strip 106 secured to the inner surface of the top flange 37 on the front wall and extending into the unit therefrom. Overlapping angle strips 107 and 108 extend longitudinally of the back and front walls between the flange 102 and the angle strip 106 and have edges engaging the upper surfaces of the bridging strip overlapping flanges 109 and 110 on the angle strips 107 and 108 have laterally elongated slots therein through which screws 112 extend, which screws are threaded into the bridging strips 105 for holding the angle strips in place. When the screws are loosened, the angle strips may be moved laterally toward and from the flange 102 and the angle strip 106 to effect adjustments of the air disseminating spaces on the opposite sides of the angle strips 107 and 108.

In the modification depicted in FIGS. 12 and 13, the top flanges 28 and 37 on the back and front walls 19 and 35 have auxiliary flanges 113 and 114 extending inwardly therefrom in opposed and substantially parallel relationship to one another. At positions spaced longitudinally of the heat dispersing unit, bridging strips 115 are supported between the inner ends of the auxiliary flanges 113 and 114 and are releasably held in place by fastening means such as clips 116 and 117 which engage and grip marginal portions of the flanges and end flange portions 118 and 119 on the bridging strips 115. A partitioning element 120 of variable width is provided in this structure by two members 122 and 123 of channel section telescopically and movably fitted together with one channel opening into the other. These channel members 122 and 123 each has laterally elongated slots in opposite sides thereof through which screws 124 extend, the screws being threaded into the bridging strips 115 for holding the engaged channel members in place. When the screws are loosened, the channel members can be spread apart to effectively widen the partitioning element, thereby to adjust the spaces between opposite sides of that element and the flanges 113 and 114, so as to effectively regulate the air flow passages on the opposite sides of the partitioning element.

In the modification illustrated in FIGS. 14 and 15, an auxiliary flange 125 extends inwardly from the top flange 37 on the front wall 35 and serves as a support to which substantially Z-shaped elements 126 are secured in longitudinally spaced relationship to one another. On the sides of the substantially Z-shaped elements 126 opposite the flange 125, a partitioning element 127 of channel section is secured thereto to extend longitudinally of the auxiliary flange 125 on the front wall portion. This provides openings of fixed dimensions between the auxiliary flange 125 on the front wall and one side of the partitioning element 127.

A channel member 128 extends longitudinally of the inner surface of the top flange 28 of the back wall 19 and has a side portion 129 secured to the inner surface of the top flange 28 with the channel opening toward the partitioning element 127. A second channel element 130 is telescopically and movably fitted into the opening between the side portions of the channel 128 with its channel opening inwardly. At positions spaced longitudinally of the channel member 130, openings are provided in the channel web and nuts are secured within the channel at those openings. Screws 132 are supported for rotation at fixed positions by the side portions of the partitioning element 127, so that as the screws are rotated, the channel member 130 is moved relative to the channel member 128 to vary the width of the airflow space between the web of the channel member 130 and the adjacent side of the partitioning element 127.

From the foregoing description and through reference to the accompanying drawings, it may be understood that I have provided a heat dispersing structure made up of separable back, front and bottom closure parts which can be readily cut to suitable lengths when necessary and cut to afford communication with ducts which communicate with the heat dispersing structure through either the back or bottom closure parts. It may be further understood that the disclosed structure is readily assemblable into a sturdy and durable heat dispersing structure in the manner aforementioned with very limited labor costs and can be constructed and arranged through only minor variations of structural detail to utilize and embody various types of easily adjustable elements for regulating the air disseminating openings along the lengths of the structure.

Having thus described my invention, what I claim as new and desire to secure by Letters Patent of the United States is:

1. In a heat dispersing structure adapted to the dissemination of air and comprising a formed sheet metal back part of predetermined length and having a substantially flat wall engaging surface, a formed sheet metal front part having a front surface extending along the back part with said front surface in spaced, substantially parallel and opposed relationship to said flat wall engaging surface, a base part closing the space between the bottoms of the front and back parts, flange means integral with the tops of each of the front and back parts and extending toward one another to define a heat disseminating slot therebetween, strip means bridging said slot between the front and back parts at positions spaced longitudinally of the parts, means supported by said strip means and extending longitudinally of said slot to divide said slot into a plurality of narrower slots, movable means for determining the effective width of one of said narrower slots, strip elements spaced longitudinally of one of said parts and secured thereto at the bottom thereof for determining the spacing between the front and back parts, and said base part comprising a sheet metal strip covering the last mentioned strip elements and extending longitudinally of the structure and laterally between the front and back parts to effectively close the bottom of the structure between the front and back parts.

2. In a heat dispersing structure as defined in claim 1, said sheet metal strip having an angularly projecting flange along one side thereof, and said one of the parts having projecting means thereon for engaging the edge of the last mentioned flange to hold the sheet metal strip in place.

3. In a heat dispersing structure as defined in claim 1, the combination being further characterized by additional strip-type elements having angularly projecting flanges at their opposite ends, and said front and back parts having clips in opposed relationship and at positions spaced longitudinally of the parts below said flange means for releasably engaging the flanges on the last mentioned strip-type elements, whereby the last mentioned strip-type elements serve as supporting spacers between the midportions of said parts.

4. In a heat dispersing structure adapted to the dissemination of air and comprising a formed sheet metal back part of a preselected length and having a generally flat back wall portion, said back wall portion having front and back surfaces and a flange projecting angularly from the front surface at the top thereof, said back wall portion also having relatively narrow strip-type spacer elements secured to the bottom margin thereof and projecting away from the front surface thereof at positions spaced longitudinally of the part, an angle strip secured to the ends of said spacer elements remote from the back wall portion and providing an upwardly projecting flange extending along the back wall portion in substantially uniformly spaced relationship thereto, said back wall portion having a row of integrally formed tabs projecting forwardly and downwardly therefrom at a level above said spacer elements, a bottom closure part having a bottom surface of a size to fit between the back wall portion and said upwardly projecting flange of the angle strip to cover said spacer elements, said bottom element having a flange engageable with said tabs for holding the bottom surface thereof against said spacer elements, a formed sheet metal front part having a front panel portion and a flange projecting from the top of said panel portion, said front part saving clip means thereon for releasable holding engagement with said angle strip to hold the bottom of the front part in place, and additional means for releasably connecting the front and back parts at positions above the bottoms thereof to hold said parts in predetermined spaced relationship to one another.

5. In a heat dispersing structure as defined in claim 4, said flanges on the tops of the front and back parts being in opposed relationship to one another in the assembly of said parts and having an air outlet slot therebetween, and the heat dispersing structure being further characterized by means extending longitudinally of the structure for dividing said slot into a plurality of flow passages.

6. In a heat dispersing structure as defined in claim 5, the combination being further characterized by means for varying the sectional width of one of said flow passages.

References Cited in the file of this patent

UNITED STATES PATENTS

| | | |
|---|---|---|
| 2,616,188 | Steinfeld | Nov. 4, 1952 |
| 2,796,016 | De Roo | June 18, 1957 |
| 2,876,691 | Woods | Mar. 10, 1959 |